(12) United States Patent
Gotadoro et al.

(10) Patent No.: US 12,388,247 B2
(45) Date of Patent: Aug. 12, 2025

(54) ASSEMBLY FOR SEALING A JUNCTURE OF A CABLE IN A WALL

(71) Applicant: THALES DIS FRANCE SAS, Meudon (FR)

(72) Inventors: Giovanni Gotadoro, Moncalieri (IT); Franco Gungui, Turin (IT)

(73) Assignee: THALES DIS FRANCE SAS, Meudon (FR)

( * ) Notice: Subject to any disclaimer, the term of this patent is extended or adjusted under 35 U.S.C. 154(b) by 312 days.

(21) Appl. No.: 17/911,689

(22) PCT Filed: Mar. 19, 2021

(86) PCT No.: PCT/EP2021/057062
§ 371 (c)(1),
(2) Date: Sep. 15, 2022

(87) PCT Pub. No.: WO2021/186019
PCT Pub. Date: Sep. 23, 2021

(65) Prior Publication Data
US 2023/0146927 A1    May 11, 2023

(30) Foreign Application Priority Data
Mar. 19, 2020 (EP) .................................... 20164229

(51) Int. Cl.
*H02G 15/007* (2006.01)
*F16J 15/06* (2006.01)
(Continued)

(52) U.S. Cl.
CPC ............ *H02G 15/007* (2013.01); *F16J 15/06* (2013.01); *H02G 15/013* (2013.01); *H02G 15/06* (2013.01)

(58) Field of Classification Search
CPC .... H02G 15/007; H02G 15/013; H02G 15/06; H02G 15/00; H02G 15/04; H02G 15/064;
(Continued)

(56) References Cited

U.S. PATENT DOCUMENTS 5,832,081 A * 11/1998 Zoiss ................... H02G 15/007
379/438
7,841,886 B2 * 11/2010 Klein ................... H01R 13/506
439/352

(Continued)

OTHER PUBLICATIONS

International Search Report (PCT/ISA/210) and Written Opinion (PCT/ISA/237) mailed on Apr. 13, 2021, by the European Patent Office as the International Searching Authority for current International Application No. PCT/EP2021/057062—[13 pages].

*Primary Examiner* — Angel R Estrada

(57) ABSTRACT

Provides is an assembly for sealing a juncture of a cable in a wall. The wall includes at least one aperture. The aperture is used for coupling a connector comprised in the cable. A cable end is provided with at least one flange. The flange surrounds at least in part the cable end. The assembly includes at least one strain relief element. The strain relief element is configured, once in a position to cooperate with the wall and the flange, to press, directly or indirectly, the flange against the wall when the connector is coupled while the strain relief element remains attached to the wall, so that the flange surrounds, directly or indirectly, the aperture and prevents, directly or indirectly, any foreign matter from passing the juncture of the cable at the aperture.

9 Claims, 5 Drawing Sheets

(51) Int. Cl.
*H02G 15/013* (2006.01)
*H02G 15/06* (2006.01)

(58) Field of Classification Search
CPC .......... F16J 15/06; H01R 13/74; H01R 13/58; H01R 13/639; H01R 13/746; H01R 13/5804; H01R 13/5202; H01R 13/6395
USPC ......... 174/668, 650, 669, 659, 665; 220/3.2, 220/3.5, 3.6
See application file for complete search history.

(56) References Cited

U.S. PATENT DOCUMENTS

| | | | | |
|---|---|---|---|---|
| 8,853,537 | B2 * | 10/2014 | Kempeneers | H02G 15/04 |
| | | | | 174/77 R |
| 9,166,337 | B2 * | 10/2015 | Boswell | H01R 13/6395 |
| 9,415,695 | B2 * | 8/2016 | Moon | B60L 1/00 |
| 9,787,035 | B1 * | 10/2017 | Wimmer | H01R 13/6581 |
| 9,853,392 | B2 * | 12/2017 | Rottman | H02G 3/081 |
| 2017/0279217 | A1 | 9/2017 | Wimmer et al. | |

* cited by examiner

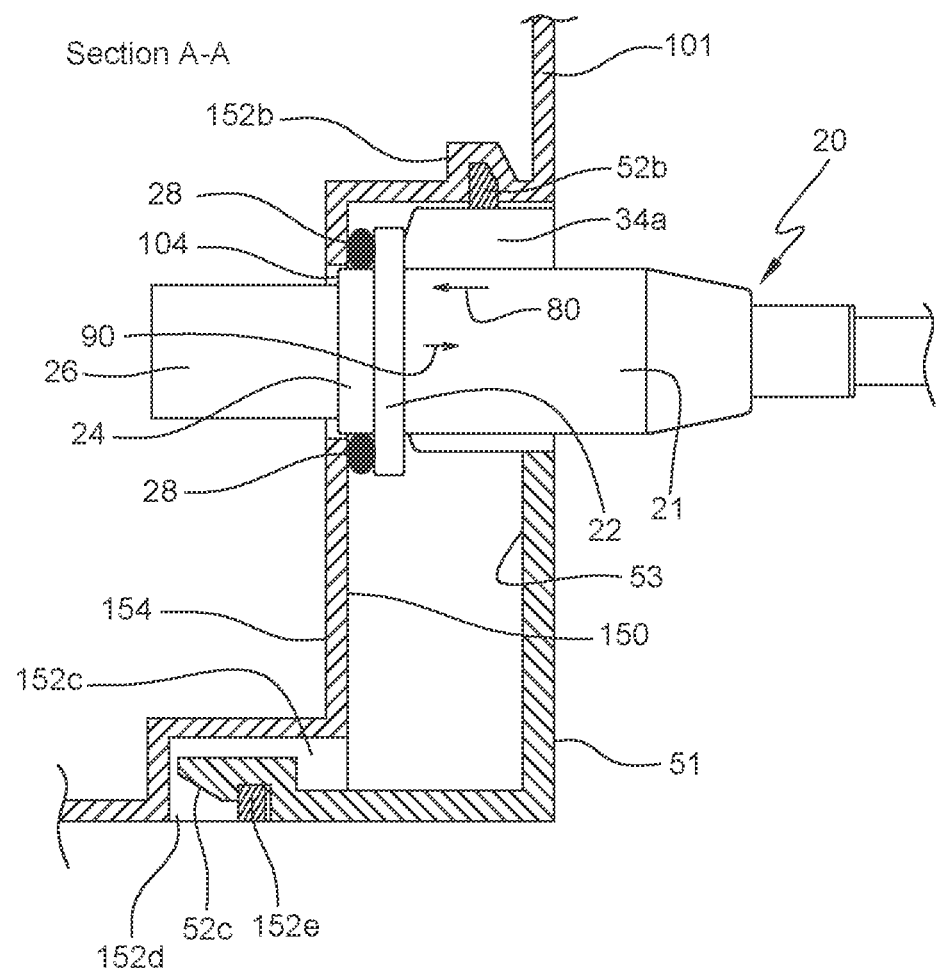

ASSEMBLY FOR SEALING A JUNCTURE OF A CABLE IN A WALL

FIELD

The invention relates to an assembly for sealing a juncture of a cable in a wall.

The wall may be comprised in a casing of an (electronic) appliance.

The appliance includes, among other devices, a fingerprint sensor type device, a fingerprint scanner type device, a Hardware Security Module (or HSM) type device, a terminal, a mobile (tele) phone type device, a Personal Digital Assistant (or PDA), a laptop, a Personal Computer (or PC) type device, a tablet, a desktop computer, a media-player, a game console, a netbook, a handset, a user terminal and/or a set-up box type device.

BACKGROUND

It is known to connect a cable of a Universal Serial Bus (or USB) type, to a fingerprint scanner, as an appliance. The cable allows supplying power to and communicating with a circuitry comprised in the appliance.

However, such a cable connection does not prevent, at a juncture of the cable in an appliance casing wall, a dust and water ingress into the appliance casing.

There is a need of a solution that allows protecting notably, at a juncture of a cable in a casing wall, from any penetration of any foreign matter into the casing.

SUMMARY

Provided is a solution for satisfying the just herein above specified need by providing an assembly for sealing a juncture of a cable in a wall.

According to the invention, the wall includes at least one aperture. The aperture is used for coupling a connector comprised within the cable. A cable end is provided with at least one flange. The flange surrounds at least in part the cable end. The assembly includes at least one strain relief element. The strain relief element is configured, once in a position to cooperate with the wall and the flange, to press, directly or indirectly, the flange against the wall when the connector is coupled while the strain relief element remains attached to the wall, so that the flange surrounds, directly or indirectly, the aperture and prevents, directly or indirectly, any foreign matter from passing the juncture of the cable at the aperture.

In a further aspect, the invention also provides an assembly for sealing a juncture of a cable in a wall, wherein, the wall including at least one aperture, the aperture being used for coupling a connector comprised within the cable, a cable end being provided with at least one flange, the flange surrounding at least in part the cable end, the assembly including at least one strain relief element, the strain relief element comprising:

- a main wall comprising a slot on an edge in the form of a cut-out, the slot being configured to receive a portion of the cable smaller than the portion provided with the flange,
- at least one pillar protruding from the main wall, wherein each of the at least one pillar is configured to push the flange against the wall when the connector is coupled while the strain relief element remains attached to the wall, so that the flange surrounds, directly or indirectly, the aperture and seals, directly or indirectly, the juncture of the cable at the aperture. This entails preventing, directly or indirectly, any foreign matter such as dust and/or water from passing the juncture of the cable at the aperture.

The principle of the invention consists in providing, on one hand, a flange(s) on a cable end and, on another hand, a strain relief element(s). The strain relief element is designed, once positioned to cooperate with a wall and the flange, to urge, directly or indirectly, the flange against the wall, while the strain relief element is fixedly retained by the wall and the connector is coupled through a wall aperture. The wall aperture is thus hermetically shrouded, by or thanks to the flange that is urged by the strain relief element, at one side of the wall. No foreign matter is thus able to cross the wall, i.e. from one side to the other side of the wall, at the juncture of the cable at the wall aperture.

In the present description, the adverb "directly" means without using any external additional element while the adverb "indirectly" means using one or several external additional elements, such as e.g., one or several gaskets.

The invention solution allows preventing from any passage of any foreign matter, such as dust and/or water, at the wall aperture.

The invention solution therefore renders a juncture of a cable in a wall dustproof and waterproof.

Moreover, the invention solution is robust in time while retaining the sealing capacity of the assembly thanks to the used strain relief element(s).

The invention solution is technically simple and efficient against a passage of any foreign matter through a wall aperture used for connecting the cable.

According to a first embodiment, the assembly further includes at least one external elastic element. The at least one elastic element is placed, prior to coupling the connector, around the cable at the front of the flange, so that the strain relief element presses the flange and the at least one elastic element together against the wall when the connector is coupled while the strain relief element remains attached to the wall.

According to a second embodiment, the flange is at least in part constituted by at least one elastic material, so that the strain relief element presses the flange and the flange elastic part together against the wall when the connector is coupled while the strain relief element remains attached to the wall.

Preferably, the strain relief element further includes at least one pillar. Each of the at least one pillar allows pushing, directly or indirectly, the flange, to the wall.

Preferably, the strain relief element further includes at least one protruding extension. Each of the at least one protruding extension allows, on one hand, coupling the strain relief element to the wall and, on another hand, retaining the strain relief element coupled to the wall.

According to a first embodiment, the at least one protruding extension forms, each, a sliding guide that allows guiding the strain relief element during an insertion of the strain relief element into a corresponding gutter comprised within the wall.

According to a second embodiment, the at least one protruding extension allows, each, attaching the strain relief element to the wall during a coupling of the strain relief element with a corresponding recess comprised within the wall.

Advantageously, the strain relief element includes at least one rib. The at least one rib allows avoiding a shrinking of the strain relief element and/or a warpage of the strain relief element after having been molded. The at least one rib is configured to add robustness to the strain relief element in use, that is, making the strain relief element more robust for use.

In a preferred embodiment, the cable includes the connector, as a first connector. The wall is included within a casing. The casing includes a second connector. The second connector faces, within the casing, the aperture. The first connector and the second connector are connected to each other.

Preferably, the strain relief element is outside the casing.

BRIEF DESCRIPTION OF THE DRAWINGS

Additional features and advantages of the invention will be apparent from a detailed description of two preferred invention embodiments, given as indicative and non-limitative examples, in conjunction with the following drawings:

FIG. 9 is a side view along the section A-A line of FIG. 8.

DETAILED DESCRIPTION

Herein under is considered a case in which the invention assembly is used for sealing a juncture of a cable of a USB type in a wall.

However, the invention assembly may be used for sealing a juncture of any type of cable in a wall.

The cable may include, among others, a mechanical type cable, a non-electrical type cable, an electrical type cable, a power supply type cable and a communication type cable. The aforementioned cable type set is not exhaustive.

Naturally, the herein below described embodiments are only for exemplifying purposes and are not considered to reduce the scope of the invention.

The same references that are present in different figures refer to one and the same elements.

Figure 1:
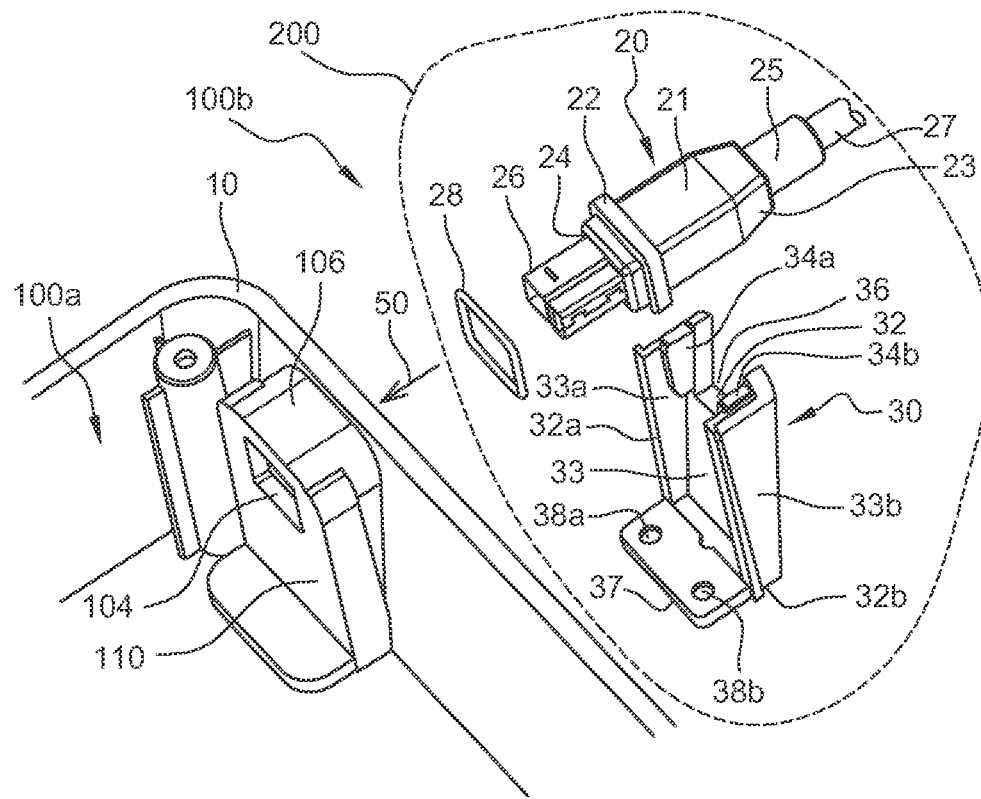
FIG. 1 is a perspective view of an interior of an appliance casing with a wall aperture used for coupling a connector at a cable end provided with a releasable elastic element and an integrated flange to be pressed by a detachable strain relief element, as external elements, according to a first embodiment of the strain relief element.

FIG. 1 presents schematically a wall 10 with an aperture 104 and an exploded view of an assembly 200 for sealing a juncture of a cable 20 in the wall 10 in a rear and top view.

The wall 10 may be included within a housing or casing (represented in part).

The casing may include several walls including the wall 10, as a first wall.

For a sake of simplicity, only the first wall 10 of the casing has been represented.

The casing may include a Printed Circuit Board (or PCB) (not represented) that comprises one or several (electrical and/or electronic) circuits.

The wall 10 may be made of e.g., a hard plastic type material. Alternatively, the wall 10 is made of metal, wood, a combination or mixture thereof or (an) other material(s).

The wall 10 includes one or several apertures 104 (only one being represented).

The aperture 104 constitutes a through hole, as a passage.

The aperture 104 is used for coupling a connector 26. The connector 26 is provided at a cable end 24.

The connector 26 includes one or several terminations of conductors comprised within the cable 20.

The PCB may be connected, through another connector, to the connector 26, that is connected, at the other end of the cable 20, to an external device, such as a PC, so as to exchange data with each other and/or to supply in power the PCB or the external device.

The connector 26 includes e.g., a USB 3.0 B type plug.

The aperture 104 may have a substantially rectangular form. Alternatively, the aperture 104 may have a form that is substantially circular, oval, square, hexagonal or any other form. The aperture 104 form conforms to the form of the cross-section of the cable end 24 that has to cross the wall 10 at the aperture 104.

The wall 10 divides a space in two sub-spaces, namely, at a first side of the wall 10, an interior 100a of the casing and, at a second side of the wall 10, an exterior 100b of the casing.

The aperture 104 allows accessing from the casing exterior 100b into the casing interior 100a and/or conversely, i.e. from the casing interior 100a into the casing exterior 100b.

The aperture 104 may allow, when at least partially open, dust, gas, a liquid(s) and/or any foreign material, to flow from the casing exterior 100b to the casing interior 100a and/or conversely, i.e. from the casing interior 100a to the casing exterior 100b.

The wall 10 has, at the aperture 104, a rear face 110 that is opposite to a front face that faces the connector 26 to be engaged or inserted into the aperture 104.

The wall 10 may have a recess 106. The recess 106 is preferably completely molded with the wall 10, so as to form one and the same element with the wall 10.

The cable 20 includes a main body 27 that is preferably relatively flexible.

The main body 27 is made of e.g., a plastic type material. The main body 27 may be substantially cylindrical or any other form, such as a substantially parallelepiped shape.

The main body 27 has, when cylindrical, a radius of the external circle of e.g., about a few mm and may be comprised in a range from about 2 mm to about 8 mm.

The main body 27 may be overlaid, at the cable end 24, with an additional layer 25, so as to rigidify and reinforce the cable end 24 for its manipulation by a user to connect or disconnect the connector 26.

The additional layer 25 may be made of e.g., a plastic type material. The additional layer 25 is preferably overmolded about the main body 27. The additional layer 25 may be substantially cylindrical or have any other form, such as a substantially parallelepiped shape.

The additional layer 25 is used for avoiding a tight curvature of the cable 20 that may damage a possible internal wire(s) and therefore a connection.

The additional layer 25 has, when cylindrical, a diameter of the external circle of e.g., about a few mm with respect to the main body 27 and may be comprised in a range from about 1 mm to about 11 mm.

The additional layer 25 and/or the main body 27 may be overlaid, at the cable end 24, with a transition layer 23, so as to make a transition or a bridge between the main body 27 and/or the additional layer 25 and a gripping layer 21.

The transition layer 23 may be made of e.g., a plastic type material. The transition layer 23 is preferably overmolded about the main body 27 and/or the additional layer 25. The transition layer 23 may have a form that is substantially e.g., a truncated pyramid, any other form, such as a substantially parallelepiped shape, or a truncated cylindrical cone. The smallest base of the truncated pyramid (or the like) of the transition layer 23 is preferably prolonged by the main body 27 and/or the additional layer 25 while the largest base of the truncated pyramid (or the like) of the transition layer 23 is preferably prolonged by the gripping layer 21. The cross-section of the transition layer is e.g., rectangular.

The length of the largest side of the smallest base of the truncated pyramid (or the like) of the transition layer 23 may be e.g., about 9 mm and is preferably at least as wide as the diameter of the additional layer 25, when present, or the diameter of the main body 27, if the additional layer 25 is not present.

The length of the largest side of the largest base of the truncated pyramid (or the like) of the transition layer 23 may be e.g., about 12 mm and is preferably as wide as the lateral side of the gripping layer 21.

The length of the smallest side of the smallest base of the truncated pyramid (or the like) of the transition layer 23 may be e.g., about 7 mm and is preferably at least as wide as the diameter of the additional layer 25, when present, or the diameter of the main body 27, if the additional layer 25 is not present.

The length of the smallest side of the largest base of the truncated pyramid (or the like) of the transition layer 23 may be e.g., about 11 mm and is preferably at least as wide as the diameter of the additional layer 25, when present, or the diameter of the main body 27, if the additional layer 25 is not present.

The gripping layer 21 is provided at the front of the cable end 24 for its grip between fingers of the user who manipulates at the gripping layer 21 the cable end 24 to be plugged into or unplugged from the wall 10. The gripping layer 21 constitutes at least in part a gripping area that is suitable for a user manipulation.

The gripping layer 21 may be made of e.g., a plastic type material that is preferably harder than the main body 27 material, when also made of a plastic type material. The gripping layer 21 is preferably molded with the main body 27, the additional layer 25 and/or the transition layer 23, so as to form one and the same element with the concerned cable portions or elements. The gripping layer 21 may have a substantially parallelepiped form. Alternatively or additionally, the gripping layer 21 is substantially cylindrical or has any other form.

The gripping layer 21 includes preferably one or several flat surfaces that may be, two by two, parallel with each other. Such a flat surface(s) allow(s) facilitating the grip of the cable end 24 by the user to plug the cable end 24 into the wall 10 or unplug the cable end 24 from the wall 10.

The length of the gripping layer 21 may be e.g., about 1.5 cm and may be comprised in a range from about 10 mm to about 60 mm.

The length of the cable end 24 may be e.g., about 4 mm and may be comprised in a range from about 1 mm to about 5 mm.

According to an essential feature, the cable 20 is provided, at the cable end 24, with one or several flanges 22 (only one being represented).

The (or each) flange 22 is preferably integrally molded with the cable end 24, so as to form one and the same element with the cable 20.

The thickness of the flange 22 may be e.g., about a few mm and may be comprised in a range from about 1 mm to about 5 mm.

Alternatively, i.e. instead of being a flange incorporated in the cable 20, as an internal flange, the (or each) flange 22, as an external flange, consists of one or several external additional elements that are fixed using, e.g., a glue(s) or welding any other fixing means, around the cable end 24.

The cross-section of the flange 22 may be substantially rectangular while being preferably rounded at the external corners.

The (or each) flange 22 is preferably made of e.g., a hard plastic type material and/or the like, at least at the back of the flange 22, so as to be pushed from the back of the flange 22 in a direction 50 towards the rear face of the wall 10, as the push direction 50.

The (or each) flange 22 forms or constitutes preferably one or several shoulders. Such a shoulder(s) (formed by the flange 22) is (are) substantially perpendicular to an axis that is defined by the cable 20 at the cable end 24. Such a shoulder(s) allow(s) applying a force that is substantially parallel to the cable 20 at the cable end 24 and that points in the push direction 50.

The (or each) flange 22 may have an external form that is substantially e.g., rectangular that may be rounded on its external corners, or any other form.

The length of the largest side of the external rectangular of the flange 22 may be e.g., about 1.7 cm and may be comprised in a range from about 1 cm to about 4 cm.

The length of the smallest side of the external rectangular of the flange 22 may be e.g., about 1.5 cm and may be comprised in a range from about 1 cm to about 4 cm.

The (or each) flange 22 surrounds in part, such as e.g., in a discontinued manner, or totally the cable end 24, so that, when the (or each) flange 22 is pushed, the (or each) flange 22 seals, directly or indirectly, a juncture of the cable 20 at the aperture 104.

In a preferred embodiment, the flange 22 surrounds completely the cable end 24.

Such a flange 22 surrounding is preferably present at the front of the gripping layer 21, so as to facilitate an insertion of the cable end 24 into the aperture 104 while using the flange 22 as one or several stops for notably a user finger(s) or a detachable strain relief element(s) 30 to push the cable end 24 in the push direction 50.

The (or each) flange 22 is used so that the detachable (or attached) strain relief element(s) 30 is (are) in capacity to press, directly or indirectly, the flange 22 against the wall 10 from the exterior 100b.

The (or each) flange 22, once in cooperation with the wall 10 and the strain relief element 30, is able to surround, directly or indirectly, the aperture 104 and prevents, directly or indirectly, any foreign matter, like e.g., dust and/or water, from passing the juncture of the cable 20 at the aperture 104, as described infra.

The assembly 200 may include one or several gaskets 28, as an external releasable (or attached) elastic element(s).

Alternately or additionally, instead of using a gasket 28, the rear face of the wall 10 is provided, around the aperture 24, with an elastic element that is either integrated in the wall 10 or fixed to the wall 10 while protruding from the rear face of the wall 10.

The (or each) gasket 28 may be made of e.g., rubber, and/or any other elastic material.

The (or each) gasket 28 is elastically deformable.

The (or each) gasket 28 has, in the middle, a through hole, so as to form a ring.

The (or each) gasket 28 has preferably substantially the form of the flange 22. The flange 22 thus enters in physical contact with the periphery of the gasket 28 preferably all around the periphery of the flange 22.

The cross-section of the gasket 28 may be substantially circular, oval, rectangular, square or have any other form.

The thickness of the gasket 28 may be e.g., about 1 mm and may be comprised in a range from about 0.8 mm to about 4 mm.

The (or each) gasket 28 is able to penetrate and/or be penetrated by, through its hole, the cable end 24.

The (or each) gasket 28 (when present) is preferably used for being placed around the cable 20 and preferably at the front of the flange 22, prior to coupling the connector 26.

Additionally or alternately, i.e. instead of using the gasket (s) 28 and/or an elastic element integrated in or fixed to the rear face of the wall 10, as an external elastic element(s), the flange 22 is overmolded (or overlaid), at the front of the flange 22, by an elastic or elastomeric material, as an internal elastic element.

The flange 22 is at least in part constituted by at least one elastic or elastomeric material, at least at the front of the flange 22.

The internal elastic or elastomeric layer of the flange 22 is elastically deformable at least at a sealing area with the wall 10. The internal elastic layer of the flange 22, as an elastic element internal to the flange 22, or the gasket 28, as an elastic element external to the flange 22, is used for sealing a juncture of the cable end 24 in the wall 10 at the aperture 104.

The wall recess 106 is preferably arranged, so as to accommodate the flange(s) 22, the strain relief element(s) 30 and possibly the gasket(s) 28, as external elements.

The strain relief element 30 is preferably made of e.g., a hard plastic type material or the like.

The strain relief element 30 includes a main wall 32.

The main wall 32 has a rear face 33 that is opposite to a front face 31.

The strain relief element 30 includes two side walls 33a and 33b that extend to the main wall 32. The side walls 33a and 33b have, each, substantially e.g., a form of a perpendicular triangle that is truncated e.g., at the bottom of the main wall 32 and the truncated side is parallel to the opposite side e.g., at the top of the main wall 32 while its largest side constitutes the lateral limit of the main wall 32.

Optionally, the strain relief element 30 includes a plate 37. The plate 37 is situated at the bottom of the main wall 32. The plate 37 forms a foot for the strain relief element 30 when seen laterally.

The plate 37 may have e.g., a rectangular form, when seen from the top or the bottom of the strain relief element 30.

The external corners of the plate 37 may be rounded.

The smallest side of the plate 37 may be e.g., about 1 cm and may be comprised in a range from about 0.5 mm to about 50 mm.

The largest side of the plate 37 may be e.g., about 2.3 cm and may be comprised in a range from about 1.5 cm to about 4.5 cm.

The thickness of the plate 37 may be e.g., about a few mm and may be comprised in a range from about 0.3 mm to about 4 mm.

Optionally, the strain relief element 30 has e.g., at the plate 37, one or several through holes 38a and 38b. Each hole 38a or 38b is used for passing a fastening element (not represented), such as a screw. The fastening element(s) allow(s) fastening the strain relief element 30 to the wall 10 or another wall that may be comprised in the casing.

The main wall 32 comprises preferably a slot 36.

The slot being arranged on an edge of the main wall 32 in the form of a cut-out.

The slot being configured to receive a portion of the cable smaller than the portion provided with the flange.

The slot 36 is defined by a through hole that is laterally bordered by two pillars 31a and 31b which are connected by a beam 31c.

The slot 36 allows a passage of the gripping area 21 through the strain relief element 30.

The main wall 32 of the strain relief element 30 is inclined backwards, i.e. in the opposite direction of the push direction 50, to align the shape of the rear face of the main wall 32 with the shape of the rear face of the wall 10. Thus, the strain relief element 30 may be perfectly integrated in the rear face of the wall 10.

The slot 36 has a form that conforms to the form of the cross-section of a part of the cable 20, like e.g., the gripping area 21.

The side walls 33a and 33b are e.g., symmetric with respect to a row that crosses the middle of the slot 36 termed middle row hereafter.

Optionally, the strain relief element 30 includes one or several ribs (not represented). When there are an even number of ribs, the ribs are preferably symmetric with respect to the middle row. The rib(s) is (are) placed under the slot 36 and provided preferably on the rear face 33 of the main wall 32. The rib(s) allow(s) avoiding a shrinking of the strain relief element 30 and/or a warpage of the strain relief element 30 (just) after having been molded. The rib(s) allow(s) making the strain relief element 30 more robust for use and retaining the strain relief element 30 with the time and allow(s) avoiding affecting the external form or design of the strain relief element 30.

The strain relief element 30 includes preferably one or several pillars 34a and 34b.

The pillar(s) 34a and 34b protrude(s) from the rear face 33 of the main wall 32. The pillar(s) 34a and 34b border(s) preferably the slot 36. The pillar(s) 34a and 34b may, each, lean against its respective side wall 33a and 33b. The pillar(s) 34a and 34b has (have), each, preferably its (their) front side that has a form that conforms to the form of the lateral sides of the flange 22.

The pillar(s) 34a and 34b allow(s) sliding, prior to or after having possibly installed the (or each) gasket 28 around the front of the flange 22, the flange 22 along the front of the pillar(s) 34a and 34b.

The front face of the pillar(s) 34a and 34b is preferably parallel to the rear face of the lateral sides of the flange 22, so as to apply a continuous contact with the rear face of the lateral sides of the flange 22.

Each of the pillars 34a and 34b allows thus pushing or pressing, directly or indirectly, the flange 22 to the rear face of the wall 10.

Each of the pillars 34a and 34b is designed to push and maintain a push or pressure, directly or indirectly, of the flange 22 towards the rear face of the wall 10.

The thickness of each of the pillars 34a and 34b of the slot 36 may be e.g., about 2 mm and may be comprised in a range from about 1 mm to about 5 mm.

The length of each of the pillars 34a and 34b of the slot 36 may be e.g., about 1.3 cm and may be comprised in a range from about 1 cm to about 4 cm.

The strain relief element 30 includes preferably one, two or more protruding extensions 32a and 32b. The protruding extension(s) 32a and/or 32b allow(s), each, on one hand, coupling the strain relief element 30 to the wall 10, and more exactly the rear face of the wall 10, and, on another hand, retaining the strain relief element 30 coupled to the wall 10, as further explained infra.

The lateral inclination of the main wall 32 with respect to the lateral protruding portion of the protruding extension 32a or 32b may be e.g., about 9 degrees and may be comprised in a range from about 1 degree to about 20 degrees.

According to a first embodiment of the strain relief element 30 represented on FIGS. 1-5, the protruding extensions 32a and/or 32b form(s), each, a sliding guide that allows guiding the strain relief element 30 during an insertion of the strain relief element 30 into a corresponding gutter 102a and 102b respectively (not visible on FIG. 1) comprised within the wall 10.

A protruding portion of the protruding extensions 32a and 32b borders laterally the strain relief element 30.

The protruding extensions 32a and 32b may be, each, perpendicular to the plate 37, when seen from a lateral side of the strain relief element 30.

The protruding extensions 32a and 32b are e.g., symmetric with respect to the middle row.

The protruding extensions 32a and 32b have, each, when seen from the rear, substantially e.g., a form of a perpendicular triangle that is slightly truncated at the opposite side of the right angle.

The length of the smallest side that is adjacent to the right angle of the protruding extension(s) 32a and/or 32b may be e.g., about 3 mm and may be comprised in a range from about 1 mm to about 15 mm.

The length of the largest side that is adjacent to the right angle of the protruding extension(s) 32a and/or 32b may be e.g., about 4.3 cm and may be comprised in a range from about 1 mm to about 15 mm.

The largest side of the corresponding perpendicular triangle constitutes the outer edge of the concerned protruding extension 32a or 32b and also constitutes, in part, the outer edge of the strain relief element 30, e.g., at the lateral side of the strain relief element 30.

The truncated side constitutes the outer edge of the concerned protruding extension 32a or 32b and also constitutes, in part, the outer edge of the strain relief element 30, e.g., at the top of the strain relief element 30.

The protruding extensions 32a and 32b are connected, from their front, to the plate 37 and, from their rear, to their respective side walls 33a and 33b. Each protruding extension 32a or 32b protrudes, on one hand, from its respective side wall 33a or 33b and, on another hand, laterally from the plate 37.

The protruding extensions 32a and 32b protrude, each, from its respective side wall 33a and 33b respectively toward the outside of the strain relief element 30.

The thickness of the protruding extension(s) 32a and/or 32b may be e.g., about 1 mm and may be comprised in a range from about 0.8 mm to about 3 mm.

The protruding portion of each of the protruding extensions 32a and 32b is designed to conform substantially to the form of the corresponding gutter 102a or 102b comprised within the wall 10, according to a first embodiment.

Figure 2:
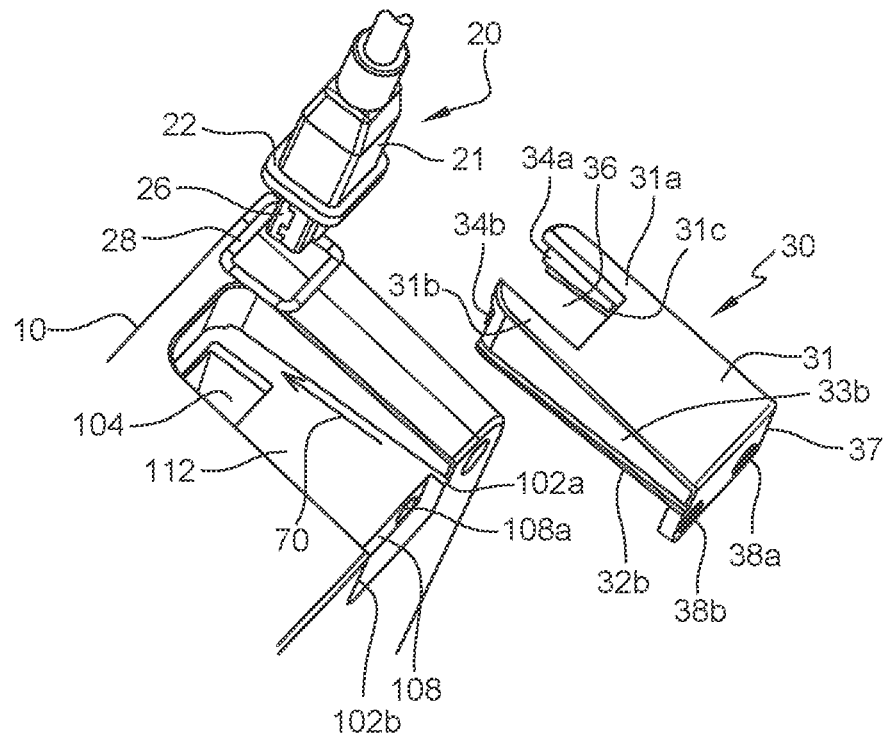
FIG. 2 is a perspective view of an exterior of the appliance casing with the wall aperture by using the external elements of FIG. 1.

FIG. 2 shows schematically, in a front and bottom view, the wall 10 and the assembly 200 for sealing a juncture of the cable 20 in the wall 10 by using the strain relief element 30 according to the first embodiment.

Each of the gutters 102a and 102b constitutes a cut-out area on the inside of a corresponding lateral side of the recess 106.

The thickness of the gutters 102a and/or 102b may be e.g., about 2 mm and may be comprised in a range from about 1 mm to about 3.5 mm.

Each of the gutters 102a and 102b allows accommodating a corresponding protruding extension 32a or 32b, and more exactly the protruding portion of the protruding extension 32a or 32b.

The cable 20 is to be connected to the wall aperture 104 by using the external elements of the assembly 200 to assemble all together.

According to a first embodiment, the assembly 200 includes the external elements, namely the flange 22, the strain relief element 30 and the gasket 28.

The form and the size of the slot 36 are configured to accommodate the gripping layer 21 of the cable 20.

The length of each of the pillars 31a and 31b that borders the slot 36 is e.g., about 1.6 cm and may be comprised in a range from about 1.5 cm to about 5 cm.

The length of the beam 31c of that borders slot 36 may be e.g., about 1.4 cm and may be comprised in a range from about 1 cm to about 5 cm.

The thickness of the pillars 31a and 31b and the beam 31c that border the slot 36 may be e.g., about 2 mm and may be comprised in a range from about 1 mm to about 4 mm.

According to the first embodiment of the strain relief element 30, the protruding extension(s) 32a and/or 32b form, each, a sliding guide and allows guiding the strain relief element 30 during an insertion of the strain relief element 30 into a corresponding gutter 102a and/or 102b respectively comprised within the wall 10.

According to the first embodiment of the strain relief element 30, the protruding extension(s) 32a and 32b form, each, a rail that allows coupling the strain relief element 30 to the wall 10, and more exactly to the front face 112 of the wall 10.

Prior to connecting the cable 20 to the wall 10, the user firstly installs, e.g., with one hand, the gasket 28 around the cable end 24 that is held with e.g., another hand.

The gasket 28, when used, and the strain relief element 30 are preferably, each, e.g., outside the casing that includes the wall 10.

After the user has installed the gasket 28 around the cable end 24, the user inserts the connector 26 into the aperture 104 by holding with fingers the gripping area 21 and pushing the cable 20 toward the wall 10. Such a connector insertion is e.g., used for connecting the connector 26 to another connector 46 (visible on FIG. 4).

Once the connector 26 is inserted in the aperture 104, the gasket 28 is blocked, at the recess 106, between the front face 112 of the wall 10 and the flange 22.

The user inserts and slides, in a sliding direction 70, the protruding extension(s) 32a and/or 32b in the corresponding gutter(s) 102a and/or 102b (which appears slightly) of the wall 10 until the pillars 31a and 31b bordering the slot 36 are stopped by the upper border of the recess 106. Optionally, the user slides, in the sliding direction 70, the protruding extension(s) 32a and/or 32b in the corresponding gutter(s) 102a and/or 102b of the wall 10 until the plate 37 reaches, simultaneously to the stopping of the pillars 31a and 31b, the upper border of another recess 108 comprised possibly in another wall comprised preferably in the casing.

Each of the protruding extensions 32a and 32b allows, on one hand, coupling the strain relief element 30 to the wall 10 and, on another hand, retaining the strain relief element 30 coupled to the wall 10.

Once the strain relief element 30 is coupled to the wall 30, the user may furthermore insert each of one or two (or more) screws (not represented) through the hole 38a or 38b of the strain relief element 30 and a corresponding non-through hole 108a or 108b of another wall (or the wall 10). Then, the user turns the screw(s) in the concerned hole(s) 38a and/or 38b and the concerned non-through hole(s) 108a and/or 108b, so as to fasten the strain relief element 30 to the wall 10 or another wall that is preferably included in the casing.

To unplug or unconnect the cable 20 from the wall 10 or the casing, the user may firstly remove the retaining screw(s) or any other fastening element(s) from the concerned non-through hole(s) 108a and/or 108b and hole(s) 38a and/or 38b.

The user slides, in a direction opposite to the sliding direction 70, the protruding extension(s) 32a and/or 32b in the corresponding gutter(s) 102a and/or 102b of the wall 10 by pushing with e.g., a finger, on the beam 31c of the slot 36 until the strain relief element 30 is released from the wall 10.

The strain relief element 30 is thus decoupled and detached from the wall 10.

Then, the user takes the cable end 24 away from the aperture 104 by holding with fingers the gripping area 21 and pulling the cable 20 from the wall 10.

The user may remove the gasket 28 from the cable end 24, so as to disassemble the assembly 200.

Figure 3:
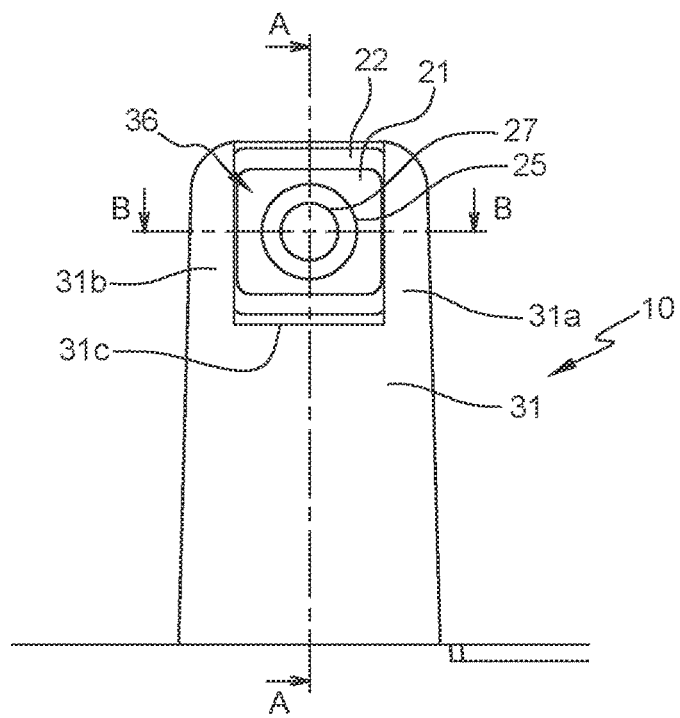
FIG. 3 is a front view of the wall aperture sealed by using the external elements of FIG. 1 when the external elements cooperate with each other to seal a juncture of the cable end in the wall by using the strain relief element.

FIG. 3 shows schematically from a rear view the connector 26 inserted in the wall 10 with two cross-section lines, a cross-section line A-A and a cross-section line B-B.

The cross-section line A-A vertically crosses the cable 20 along its diameter and the slot 30 at the middle row.

The cross-section line B-B is perpendicular to the first cross-section line A-A. The cross-section line B-B horizontally crosses the cable 20 along its diameter.

The strain relief element 30 is configured, once in a position to cooperate with wall 10 and the flange 22, to press, directly or indirectly, the flange 22 against the wall 10 when the connector 26 is coupled while the strain relief element 30 remains attached to the wall 10.

Thus, the flange 22 surrounds, directly or indirectly, the aperture 104 and prevents, directly or indirectly, any foreign matter from passing the juncture of the cable 20 at the aperture 104.

The strain relief element 30 presses the lateral sides of the flange 22 through the pillars 34a and 34b (hidden on FIG. 3) which extend respectively the pillars 31a and 31b which border the slot 36.

The aperture 104 is closed with the cable end 24 provided with the flange 22 that seals, through either the gasket 28, as an external elastic element in a first embodiment that is further described infra, or an elastic portion of the flange 22, as an internal elastic element, thanks to the strain relief element 30.

Once positioned to cooperate with the wall 10 and the flange 22, the rear face 31 of the strain relief element 30 may be completely integrated in the wall 10, i.e. no part of the strain relief element 30 protrudes from the wall 10.

The strain relief element 30 is coupled to the wall 10 that may be comprised within a casing.

Figure 4:
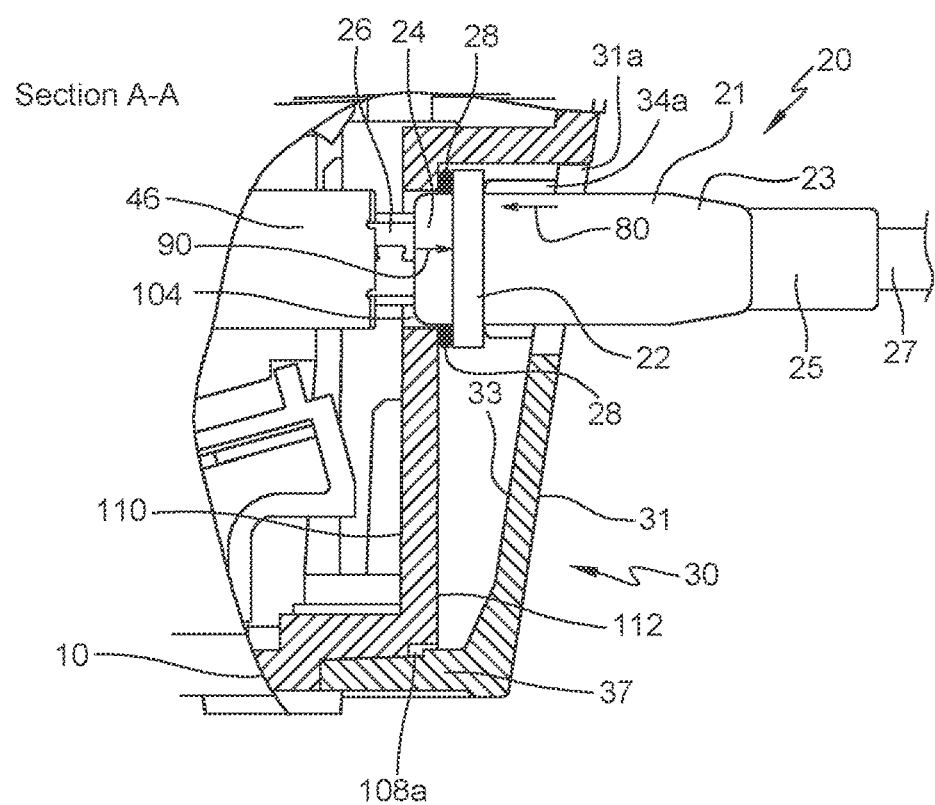
FIG. 4 is a side view along the section A-A line of FIG. 3.

FIG. 4 shows schematically, along the cross-section line A-A, the cable end 24 inserted in the wall 10, the gasket 28 pressed by the flange 22 and the strain relief element 30 that presses the flange 22.

The casing includes e.g., the connector 46, as a first connector. The first connector 46 is fixed within the casing. The first connector 46 faces, within the casing, the aperture 104 of the wall 10 (represented with a first hatched area).

The cable 20 includes a corresponding connector 26, as a second connector.

The first connector 46 and the second connector 26 are connected to each other. The first connector 46 is e.g., a female connector while the second connector 26 is e.g., a male connector or the reverse, namely the first connector 46 is e.g., a male connector while the second connector 26 is e.g., a female connector.

The strain relief element 30 presses the flange 22 and an elastic element, namely the gasket 28, as an external elastic element, or an elastic part of the flange 22, as an internal elastic element (not represented), together against the wall 10 when the connector 26 is coupled to another connector 46 while the strain relief element 30 remains attached to the wall 10.

According to the alternative embodiment, the strain relief element 30 presses the flange 22 and the flange elastic part, so that the strain relief element 30 presses the flange 22 and the flange elastic part together against the wall 10 when the connector 26 is coupled to another connector 46 while the strain relief element 30 remains attached to the wall 10.

The pillar 34a (represented with a non-hatched area) and the pillar 34b (not visible on FIG. 4) of the strain relief element 30 (represented with a second hatched area) exert, each, a pressure force, in a pressure direction 80, on the flange 22 toward the wall 10.

The flange 22 exerts, in turn, the same pressure force, in the pressure direction 80, on the gasket 28 (represented with a blackened area) toward the wall 10.

The gasket 28 which is blocked or stopped, on one side, by the rear face 112 of the wall 10 and pushed, on another side, through the front face of the flange 22, by the pillars 34a and 34b of the strain relief element 30, deforms elastically.

The gasket 28, as an external elastic element, is thus compressed against the wall 10 and surrounds the aperture 104. The gasket 28 seals the juncture of the cable 20 in the wall 10.

In reaction to the pressure force exerted on the stopped gasket 28 by the flange 22, the gasket 28 exerts a reaction force toward the flange 22, in a direction opposite to the pressure direction 80, as a reaction direction 90.

The first connector 46 and the second connector 26 are connected to each other, so that a power supply of the internal circuits is possible and the internal circuits are able to communicate with an external device, such as a PC.

Once the first connector 46 and the second connector 26 are connected to each other, the corresponding appliance is able to operate.

Figure 5:
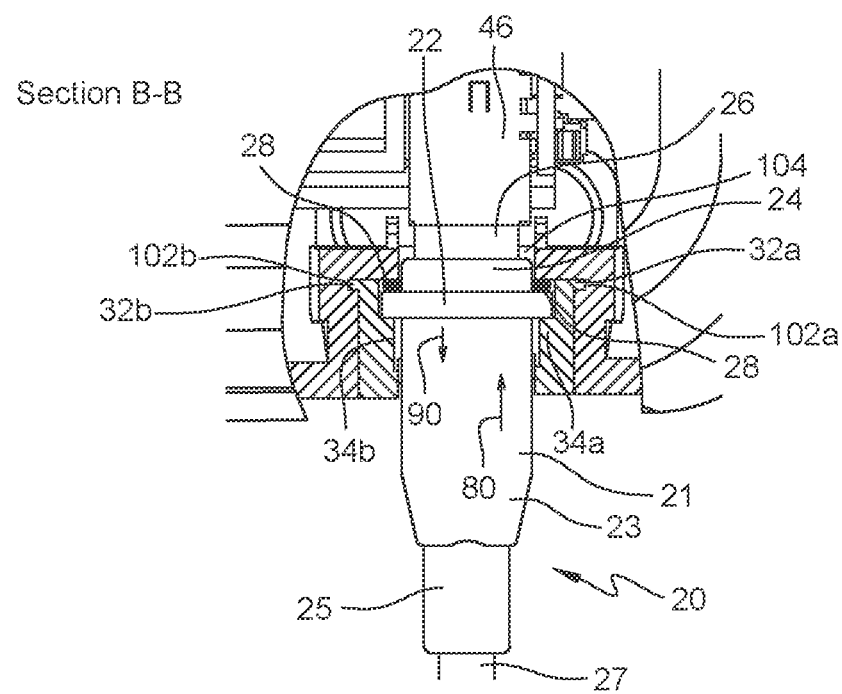
FIG. 5 is a top view along the section B-B line of FIG. 3.

FIG. 5 shows schematically, along the cross-section line B-B, the cable end 24 inserted in the wall 10, the gasket 28 pressed by the flange 22 and the strain relief element 30 that presses the flange 22.

According to the first embodiment of the strain relief element 30, the protruding portion of each of the protruding extensions 32a and 32b of the strain relief element 30 is blocked within the corresponding gutter 102a and 102b included within the wall 10.

Each of the gutter 102a and 102b has e.g., a U-shaped with a first lateral side that is proximate to the rear face 112 of the wall 10 and a second lateral side that is remote from the rear face 112 of the wall 10.

Each of the gutter 102a and 102b is designed to accommodate the protruding portion of the protruding extension(s) 32a and 32b of the strain relief element 30.

Each of the protruding extensions 32a and 32b of the strain relief element 30 that is stopped by the remote side (from the rear face 112 of the wall 10) of the corresponding gutter 102a or 102b allows opposing to the reaction force 90 exerted, via an elastic element, namely the gasket 28, as an external elastic element, or an elastic part of the flange 22, as an internal elastic element (not represented), from the wall 10 (and more exactly its front face 112), through the flange 22, to the strain relief element 30.

Each of the protruding extensions 32a and 32b of the strain relief element 30 allows retaining the strain relief element 30 coupled to the wall 10.

Figure 6:
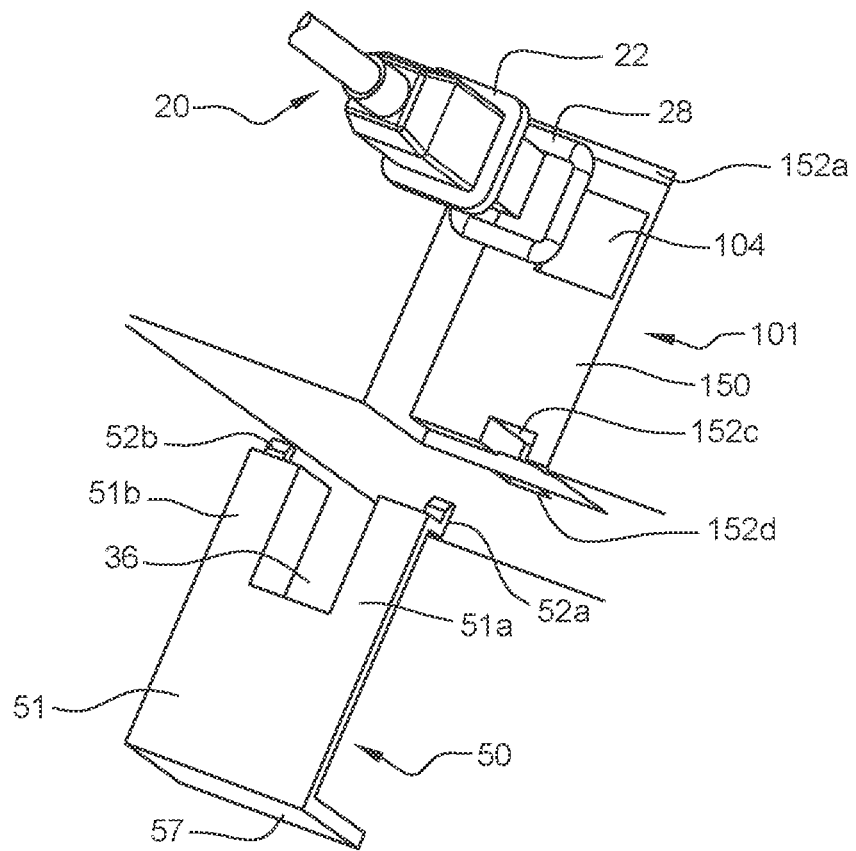
FIG. 6 is a perspective view of an exterior of an appliance casing with a wall aperture used for coupling a connector at a cable end provided with a releasable elastic element and an integrated flange to be pressed by a detachable strain relief element, as external elements, according to a second invention embodiment of the strain relief element.

FIG. 6 shows schematically, in a front and bottom view, a wall 101, according to a second embodiment, and the assembly 200 for sealing a juncture of the cable 20 in the wall 101, by using a strain relief element 50 according to a second embodiment.

The wall 101 includes a recess 150.

The wall 101 comprises a plurality of coupling/decoupling recesses 152a, 152b (not visible on FIG. 6), 152c and 152d.

Each of the coupling/decoupling recesses 152a, 152b, 152c and 152d constitutes either a non-through hole or a through hole on the inside of the recess 150 of the wall 101 or another wall.

Each of the coupling/decoupling recesses 152a, 152b, 152c and 152d allows coupling and decoupling a corresponding protruding extension 52a, 52b or 52c (not visible on FIG. 6) of the strain relief element 50.

The thickness of the coupling/decoupling recesses 152a, 152b, 152c and 152d may be e.g., about 2 mm and may be comprised in a range from about 1 mm to about 5 mm.

Each of the coupling/decoupling recesses 152a, 152b, 152c and 152d allows accommodating at least in part the corresponding protruding extension 52a, 52b or 52c of the strain relief element 50, and more exactly its protruding portion.

The strain relief element 50 according to the second embodiment is identical to the strain relief element 30 according to the first embodiment, except for the form (or design) of its protruding extension(s). Each of the protruding extension(s) of the first and second embodiments of the strain relief element allows coupling the strain relief element to the wall and retaining the strain relief element coupled to the wall.

According to the second embodiment of the strain relief element 50, each of the three protruding extensions 52a, 52b and 52c (not visible on FIG. 6) forms a lug. The lug is used for coupling the strain relief element 50 to the wall 101 and retaining the strain relief element 50 coupled to the wall 101.

Two protruding extensions 52a and 52b prolong pillars 51a and 51b respectively that border the slot 36.

Each of the protruding extensions 52a, 52b and 52c allows attaching the strain relief element 50 to the wall 101 during a coupling of the strain relief element 50 with a corresponding coupling/decoupling recess 152a, 152b and 152c respectively comprised within the wall 101 or another wall that is possibly comprised in the casing that comprises the wall 101.

Figure 7:
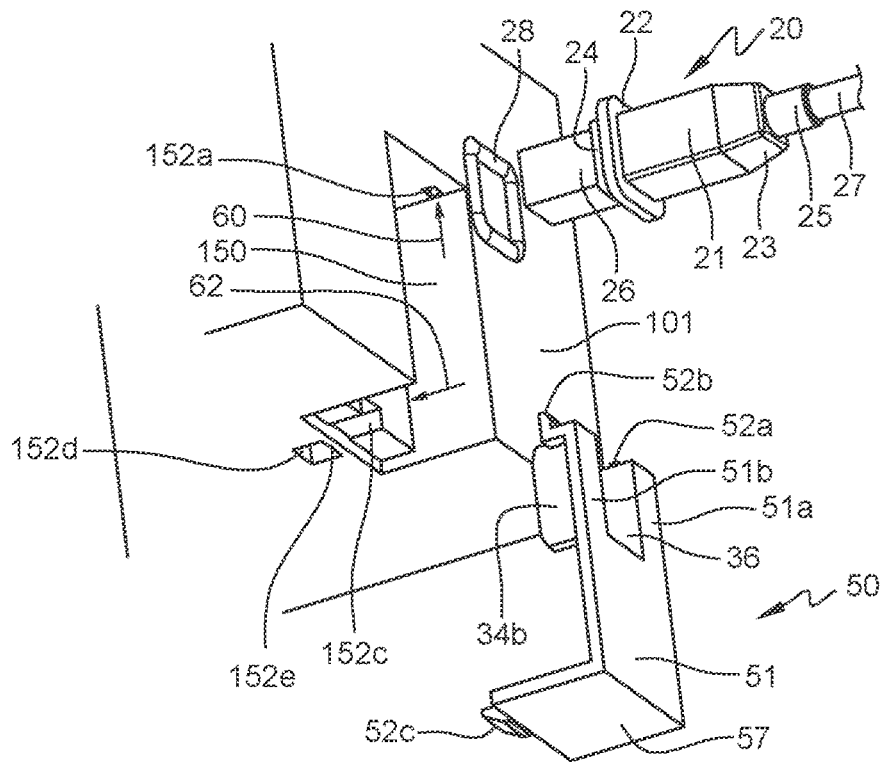
FIG. 7 is another perspective view of the elements of FIG. 6.

FIG. 7 shows schematically, in a bottom and lateral view, the wall 101, and the assembly 200 for sealing a juncture of the cable 20 in the wall 101, by using the strain relief element 50.

Prior to connecting the cable 20 to the wall 101, the user firstly installs, e.g., with one hand, the gasket 28 around the cable end 24 that is held with e.g., another hand.

The gasket 28, when used, and the strain relief element 50 are preferably, each, e.g., outside the casing that includes the wall 101.

After the user has installed the gasket 28 around the cable end 24, the user inserts the cable end 24 into the aperture 104 by holding with fingers the gripping area 21 and pushing the cable 20 toward the wall 101. Such a cable end insertion is e.g., used for connecting the connector 26 to another connector (not visible).

Once the cable end 24 is inserted in the aperture 104, the gasket 28 is blocked, at the recess 150, between the front face of the wall 101 and the flange 22.

The user inserts, in a first insertion direction 60, the two protruding extensions 52a and 52b in the corresponding coupling/decoupling recesses 152a and 152b (not visible on FIG. 7) of the wall 101, so as to retain the strain relief element 50 at its upper side.

Then, the user inserts, in a second insertion direction 62, the third protruding extension 52c in a corresponding coupling/decoupling recess 152c of the wall 101 until the third protruding extension 52c is locked in a coupling/decoupling recess 152d comprised possibly in another wall comprised preferably in the casing. Thus, the strain relief element 50 is attached and coupled to the wall 10

Each of the protruding extensions 52a, 52b and 52c allows, on one hand, coupling the strain relief element 50 to the wall 101 and, on another hand, retaining the strain relief element 50 coupled to the wall 101.

To unplug or unconnect the cable 20 from the wall 101 or the casing, the user firstly pushes, in the coupling/decoupling recess 152d, with a pen, a screwdriver or the like, the third protruding extension 52c, so as to unlock the third protruding extension 52c from the coupling/decoupling recess 152d and remove, in a direction opposite to the second insertion direction 62, the third protruding extension 52c from the coupling/decoupling recess 152c.

The user removes, in a direction opposite to the first insertion direction 60, the protruding extensions 52a and 52b from the corresponding coupling/decoupling recesses 152a and 152b of the wall 101 by pulling with e.g., a finger, on the beam 31c of the slot 36 until the strain relief element 50 is released from the wall 101.

The strain relief element 50 is thus decoupled and detached from the wall 101.

Then, the user takes the cable end 24 away from the aperture 104 by holding with fingers the gripping area 21 and pulling the cable 20 from the wall 101.

The user may remove the gasket 28 from the cable end 24, so as to disassemble the assembly 200.

Figure 8:
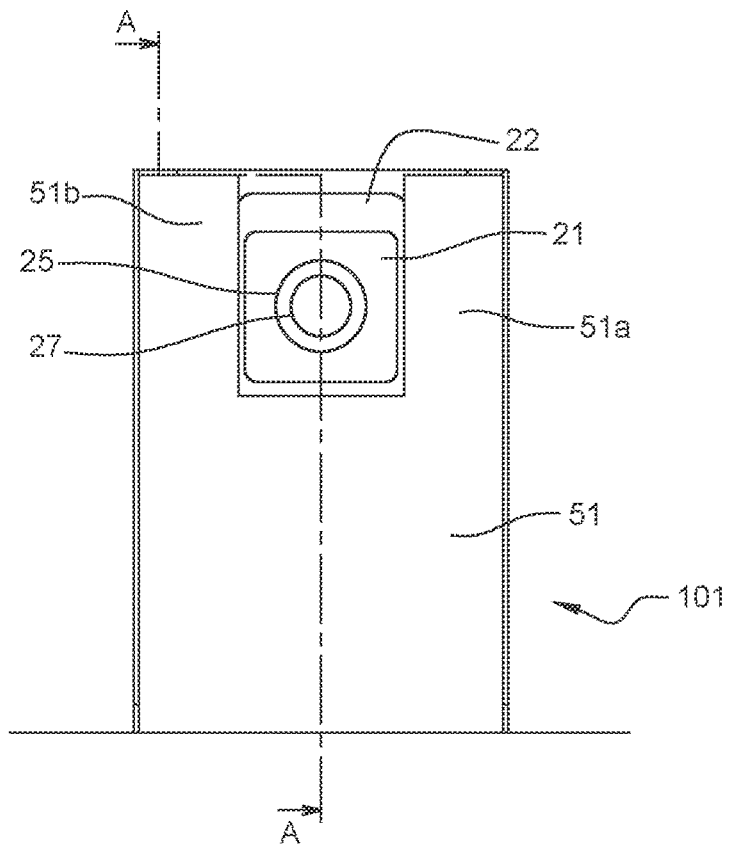
FIG. 8 is a front view of the wall aperture sealed by using the external elements of FIG. 7 when the external elements cooperate with each other to seal a juncture of the cable end in the wall by using the strain relief element.

FIG. 8 shows schematically from a rear view the cable end 24 inserted in the wall 101 with a cross-section line A-A.

The cross-section line A-A vertically crosses the cable 20 along its diameter and the slot 36 at the middle row.

The strain relief element 50 is configured, once in a position to cooperate with wall 101 and the flange 22, to press, directly or indirectly, the flange 22 against the wall 101 when the connector 26 is coupled while the strain relief element 50 remains attached to the wall 101.

Thus, the flange 22 surrounds, directly or indirectly, the aperture 104 and prevents, directly or indirectly, any foreign matter, such as dust and/or water, from passing the juncture of the cable 20 at the aperture 104.

The strain relief element 50 presses the lateral sides of the flange 22 through the pillars 34a and 34b (hidden on FIG. 8) which extend respectively the pillars 51a and 51b which border the slot 36.

The aperture 104 is almost closed with the cable end 24 provided with the flange 22 that seals, through either the gasket 28, as an external elastic element in a first embodiment that is further described infra, or an elastic (or elastomeric) portion of the flange 22, as an internal elastic element, thanks to the strain relief element 50.

Once positioned to cooperate with the wall 101 and the flange 22, the rear face 51 of the strain relief element 50 may be completely integrated in the wall 101, i.e. no part of the strain relief element 50 protrudes from the wall 101.

The strain relief element 50 is coupled to the wall 101 that may be comprised within a casing.

The recess 150 and the strain relief element 50 are preferably designed in a complementary way, so that, once the strain relief element 50 is in position of cooperation with the recess 150, the form of the strain relief element 50 is substantially integrated within the form of the wall 101. Thus, the external face 51 of the strain relief element 50 does not protrude from the external face of the wall 101.

FIG. 9 shows schematically, along the cross-section line A-A, the cable end 24 inserted in the wall 101, the gasket 28 pressed by the flange 22 and the strain relief element 50 that presses the flange 22.

The two protruding extensions 52b and 52a (not visible on FIG. 9) are lodged in their corresponding coupling/decoupling recesses 152b and 152a (not visible on FIG. 9) of the wall 101, so as to retain the strain relief element 50 at its upper side.

The third protruding extension 52c is engaged in the coupling/decoupling recess 152c of the wall 101 while emerging from the coupling/decoupling recess 152d, so as to be accessible from the outside of the wall 101.

The strain relief element 50 presses the flange 22 and an elastic element, namely the gasket 28, as an external elastic element, or an elastic part of the flange 22, as an internal elastic (or elastomeric) element (not represented), together against the wall 101 when the connector 26 is coupled while the strain relief element 50 remains attached to the wall 101.

According to the alternative embodiment, the strain relief element 50 presses the flange 22 and the flange elastic part, so that the strain relief element 50 presses the flange 22 and the flange elastic part together against the wall 101 when the connector 26 is coupled while the strain relief element 50 remains attached to the wall 101.

The pillar 34a (represented with a non-hatched area) and the pillar 34b (not visible on FIG. 9) of the strain relief element 50 (represented with a second hatched area) exert, each, a pressure force, in a pressure direction 80, on the flange 22 toward the wall 101.

The flange 22 exerts, in turn, the same pressure force, in the pressure direction 80, on the gasket 28 (represented with a third hatched area) toward the wall 101.

The gasket 28 which is blocked or stopped, on one side, by the rear face of the wall 101 and pushed, on another side, through the front face of the flange 22, by the pillars 34a and 34b of the strain relief element 50, deforms elastically.

The gasket 28, as an external elastic element, is thus compressed against the wall 101 and surrounds the aperture 104. The gasket 28 seals the juncture of the cable 20 in the wall 101.

In reaction to the pressure force exerted on the stopped gasket 28 by the flange 22, the gasket 28 exerts a reaction force toward the flange 22, in a direction opposite to the pressure direction 80, as a reaction direction 90.

The three protruding extensions 52a, 52b and 52c are coupled to the wall 101 and allow retaining the strain relief element 50 coupled to the wall 101 despite the presence of the reaction force.

The invention solution allows using notably a standard and cheap connector to a PCB.

The invention solution allows keeping the electronic architecture without modifying it, when present in the appliance.

The invention solution uses a strain relief element(s) that is (are) simple and cheap to manufacture.

The invention solution uses an assembly that allows sealing a juncture of a cable in a wall while avoiding any passage of foreign matter through a wall aperture.

The invention claimed is:

1. An assembly (200) for sealing a juncture of a cable (20) in a wall (10), wherein, the wall including at least one aperture (104), the aperture being used for coupling a connector comprised within the cable, a cable end being provided with a flange (22), the flange surrounding at least in part the cable end, the assembly including a strain relief element (30), the strain relief element comprising:
   a main wall (32) comprising a slot (36) having a form that conforms to the form of cross-section of a part of the cable (20) allowing a passage of this part of the cable through the strain relief element (30),
   at least one pillar (34a, 34b) protruding from the main wall (32) and laterally bordering the slot (36), wherein each of the at least one pillar is configured to push the flange against the wall when the connector is coupled while the strain relief element remains attached to the wall, so that the flange surrounds, directly or indirectly, the aperture and seals, directly or indirectly, the juncture of the cable (20) at the aperture thus preventing, directly or indirectly, any foreign matter such as dust and/or water from passing the juncture of the cable at the aperture.

2. The assembly according to claim 1, wherein the assembly further includes at least one external elastic element (28), the at least one elastic element being placed, prior to coupling the connector, around the cable at the front of the flange, so that the strain relief element presses the flange and the at least one elastic element together against the wall when the connector is coupled while the strain relief element remains attached to the wall.

3. The assembly according to claim 1, wherein the flange is at least in part constituted by at least one elastic material, so that the strain relief element presses the flange and the flange elastic part together against the wall when the connector is coupled while the strain relief element remains attached to the wall.

4. The assembly according to claim 3, wherein the strain relief element further includes at least one protruding extension, each of the at least one protruding extension allowing, on one hand, coupling the strain relief element to the wall and, on another hand, retaining the strain relief element coupled to the wall.

5. The assembly according to claim 4, wherein the at least one protruding extension (32a, 32b) forms, each, a sliding guide that allows guiding the strain relief element during an insertion of the strain relief element into a corresponding gutter (102*a*) comprised within the wall.

6. The assembly according to claim 5, wherein the at least one protruding extension (52*a*, 52*b*, 52*c*) allows, each, attaching the strain relief element to the wall during a coupling of the strain relief element with a corresponding recess (152*a*, 152*b*, 152*c*) comprised within the wall.

7. The assembly according to claim 6, wherein the strain relief element includes at least one rib, the at least one rib being configured to add robustness to the strain relief element.

8. The assembly according claim 7, wherein, the cable includes the connector, as a first connector (26), the wall being included within a casing, the casing including a second connector (46), the second connector facing, within the casing, the aperture, the first connector and the second connector being connected to each other.

9. The assembly according to claim 8, wherein the strain relief element is outside the casing.

\* \* \* \* \*